United States Patent
Scheich et al.

(10) Patent No.: US 9,957,431 B2
(45) Date of Patent: May 1, 2018

(54) COMPOSITE MATERIAL, HEAT-ABSORBING COMPONENT, AND METHOD FOR PRODUCING THE COMPOSITE MATERIAL

(71) Applicants: Gerrit Scheich, Seligenstadt (DE); Christian Schenk, Ingelheim (DE); Frank Wessely, Dieburg (DE); Nadine Tscholitsch, Hanau (DE); Ashur J. Atanos, Buford, GA (US); Christian Neumann, Hungen (DE); Stephan Moritz, Alzenau (DE); Dirk Michel, Erbstadt (DE)

(72) Inventors: Gerrit Scheich, Seligenstadt (DE); Christian Schenk, Ingelheim (DE); Frank Wessely, Dieburg (DE); Nadine Tscholitsch, Hanau (DE); Ashur J. Atanos, Buford, GA (US); Christian Neumann, Hungen (DE); Stephan Moritz, Alzenau (DE); Dirk Michel, Erbstadt (DE)

(73) Assignees: Heraeus Quarzglas GmbH & Co. KG, Hanau (DE); Heraeus Quartz America LLC, Austin, TX (US)

( * ) Notice: Subject to any disclaimer, the term of this patent is extended or adjusted under 35 U.S.C. 154(b) by 77 days.

(21) Appl. No.: 14/077,182

(22) Filed: Nov. 11, 2013

(65) Prior Publication Data
US 2015/0132511 A1 May 14, 2015

(51) Int. Cl.
*C09K 5/14* (2006.01)
*B28B 1/26* (2006.01)
(Continued)

(52) U.S. Cl.
CPC .............. *C09K 5/14* (2013.01); *B28B 1/26* (2013.01); *C03B 19/066* (2013.01);
(Continued)

(58) Field of Classification Search
CPC ....... C09K 5/14; C03C 14/006; C03C 14/004; C03C 2214/16; C03C 2214/04;
(Continued)

(56) References Cited

U.S. PATENT DOCUMENTS 3,301,635 A * 1/1967 Bergna .................... C04B 35/14
264/332
3,837,825 A * 9/1974 Loxley .................... C03B 19/06
264/662
(Continued)

FOREIGN PATENT DOCUMENTS

| DE | 4440104 A1 | 5/1995 |
| DE | 69527918 T2 | 4/2003 |
| EP | 0715342 A2 | 6/1996 |
| EP | 1580170 A1 | 9/2005 |
| JP | 2002283015 A | 10/2002 |

OTHER PUBLICATIONS

Congdon, "High-purity silica reflecting heat shield development," 1974, p. 1-109.*
(Continued)

*Primary Examiner* — James C Yager
*Assistant Examiner* — Kevin C Ortman, Jr.
(74) *Attorney, Agent, or Firm* — Tiajoloff & Kelly LLP

(57) ABSTRACT

In a known composite material with a fused silica matrix there are regions of silicon-containing phase embedded. In order to provide a composite material which is suitable for producing components for use in high-temperature processes for heat treatment even when exacting requirements are imposed on impermeability to gas and on purity, it is proposed in accordance with the invention that the composite material be impervious to gas, have a closed porosity of
(Continued)

less than 0.5% and a specific density of at least 2.19 g/cm³, and at a temperature of 1000° C. have a spectral emissivity of at least 0.7 for wavelengths between 2 and 8 μm.

20 Claims, 3 Drawing Sheets

(51) Int. Cl.
| | |
|---|---|
| *C04B 35/14* | (2006.01) |
| *C04B 35/64* | (2006.01) |
| *F27B 14/10* | (2006.01) |
| *C03C 14/00* | (2006.01) |
| *C03B 19/06* | (2006.01) |
| *F27B 14/08* | (2006.01) |

(52) U.S. Cl.
CPC .......... *C03C 14/004* (2013.01); *C03C 14/006* (2013.01); *C04B 35/14* (2013.01); *C04B 35/64* (2013.01); *F27B 14/10* (2013.01); *C03C 2214/04* (2013.01); *C03C 2214/08* (2013.01); *C03C 2214/16* (2013.01); *C03C 2214/30* (2013.01); *F27B 2014/0843* (2013.01); *Y10T 428/131* (2015.01)

(58) Field of Classification Search
CPC . C03C 2214/30; C03C 2214/08; C04B 35/64; C04B 35/14; Y10T 428/131; F27B 2014/0843; F27B 14/10; C03B 19/066; B28B 1/26
USPC ............ 428/68, 76, 920, 921, 545, 546, 547
See application file for complete search history.

(56) References Cited

U.S. PATENT DOCUMENTS

| | | | | |
|---|---|---|---|---|
| 4,033,780 | A | * 7/1977 | Baumgartner | .......... C03B 19/06 |
| | | | | 501/133 |
| 5,674,792 | A | * 10/1997 | Moritz | ...................... B22C 9/12 |
| | | | | 501/133 |
| 5,736,206 | A | 4/1998 | Englisch et al. | |
| 5,985,779 | A | * 11/1999 | Sayce | ..................... C03B 3/026 |
| | | | | 501/54 |
| 6,486,084 | B2 | 11/2002 | Oda et al. | |
| 7,841,211 | B2 | 11/2010 | Sato et al. | |
| 2006/0059948 | A1 | 3/2006 | Sato et al. | |
| 2010/0240514 | A1* | 9/2010 | Mittermeier | ............... B01J 2/02 |
| | | | | 501/32 |

OTHER PUBLICATIONS

Espacenet English language abstract of DE 69527918 T2, published Apr. 24, 2003.
Espacenet English language abstract of JP 2002283015 A, published Oct. 2, 2002.
Espacenet English language abstract of DE 4440104 A1, published May 18, 1995.
J. Manara, M. Keller, D. Kraus, M. Arduini-Schuster; "Determining the Transmittance and Emittance of Transparent and Semitransparent Materials at Elevated Temperatures"; 5th European Thermal-Sciences Conference, The Netherlands (2008).
D. Widmann, H. Mader, H. Friedrich, "Technology of integrated circuits"; Springer Verlag (2000), ISBN-10:3-540-66199-9, and especially in its chapter 3, "Film Technology".

* cited by examiner

COMPOSITE MATERIAL, HEAT-ABSORBING COMPONENT, AND METHOD FOR PRODUCING THE COMPOSITE MATERIAL

TECHNOLOGICAL BACKGROUND

The invention relates to a composite material with a matrix of fused silica, in which regions of silicon-containing phase—"Si phase"—have been embedded.

The invention further concerns a heat-absorbing component composed of the composite material, and also a method for producing it by forming a porous shaped body from a powder mixture comprising amorphous fused silica powder and a silicon-containing powder—"Si powder"—and/or from a mixed powder of amorphous fused silica interspersed with silicon-containing phase—"Si—$SiO_2$ powder"—and compacting the shaped body to give the composite material.

PRIOR ART

Fabrication processes for semiconductor components and optical displays use a host of equipment such as reactors, apparatuses, carrier trays, bells, crucibles, protective shields, or else more simple components such as tubes, rods, plates, flanges, rings or blocks. They are required to satisfy exacting requirements in respect of purity, chemical and thermal stability, and mechanical strength. They may consist, for example, of stainless steel, but are increasingly being made from fused silica. The reason is that, given high purity, the silicon dioxide material behaves inertly towards the usual semiconductor materials. Fused silica, moreover, is notable for high chemical stability with respect to numerous process media, and also for high stability with respect to fluctuating temperatures.

An apparatus for the heat treatment of individual semiconductor wafers is known from DE 695 27 918 T2. It comprises a dome-shaped reactor vessel and a heater which is installed outside the reactor vessel, in the ceiling portion. The reactor vessel is produced as a one-part fused silica body without a welded portion, and in the heat-exposed ceiling portion is made from transparent fused silica, and otherwise from opaque fused silica.

Fused silica, however, is brittle and cannot be worked mechanically as easily as, for instance, metal. The mechanical working is improved according to U.S. Pat. No. 6,486, 084 B2 by a composite material of the generic type stated at the outset, in which a fused silica matrix is intercalated with a second phase comprising silicon, SiC, silicon nitride, titanium nitride or titanium carbide. In the case of the composite material comprising silicon and fused silica, the weight fraction of the fused silica phase is approximately 60% to 85%. The Si—$SiO_2$ composite material is produced by mixing silicon powder having an average particle size of 0.9 μm and a purity of 99.99% with fused silica powder having an average particle size of 0.6 μhot-pressing the powder mixture to form a shaped body, and then sintering this body under reduced pressure at 1400° C. to give the composite material. It has an open porosity of 1%.

An Si—$SiO_2$ composite material of this kind is also described in JP 02283015 A. The semimetallic silicon phase—also referred to below as "Si phase"—makes up not more than 5% by weight, and is provided on the basis of silicon powder having a particle size of not more than 100 μm. The composite material features high temperature resistance and dimensional stability even in a humid atmosphere.

Composite materials comprising heat-absorbing black fused silica are also employed for applications in which rapid temperature changes occur, such as in the case of lamp-assisted RTP (Rapid Thermal Processing) systems, for instance. One particular challenge here is the reproducible establishment of a uniform temperature distribution on the semiconductor wafer to be treated. Nonuniformities in the treatment temperature can lead to nonuniform physical properties, such as, for example, in the particle size and in the concentration of dopants, which may destroy an electronic circuit and reduce the yield.

The production of black, synthetic fused silica is described in EP 1 580 170 A1. There, porous $SiO_2$ material is treated with a reductive, carbon-containing medium, such as carbon monoxide for instance, at an elevated temperature of around 100 to 800° C., and is subsequently vitrified at a temperature of around 1300 to 1900° C. The carbon content is in the 100-10 000 ppm by weight range.

When a component of this kind is used under oxidizing conditions, however, it is necessary to protect the carbon from oxidation, in the form, for example, of a protective layer of pure $SiO_2$. A protective layer of this kind, though, may intensify the reflection of the component.

TECHNICAL OBJECTIVE

Fine-grained powders can easily cake together, and so one difficulty when producing the known composite material is to mix the finely divided fused silica powder uniformly with the finely divided metal or semimetal powder. The consequence is a heterogeneous distribution of the phases within the composite material, which in turn promotes the devitrification tendency of the fused silica phase. When deployed in high-temperature processes, the component comprising the composite material may fail as a result of crystallization and cracking.

The known composite material exhibits open porosity and is therefore not suitable for applications where high purity or imperviousness to gas are important factors. Over the course of the deployment, contaminants may collect in the open pores and reach the material to be treated.

It is an object of the invention, therefore, to provide a composite material which is suitable for the production of components for use in high-temperature processes for heat treatment even when exacting requirements are imposed on impermeability to gas and on purity.

A further object of the invention is to specify a method which permits reproducible production of a composite material of this kind.

SUMMARY OF THE INVENTION

With regard to the material, this object is achieved, starting from a composite material of the generic type specified at the outset, in accordance with the invention by a composite material which is impervious to gas, has a closed porosity of less than 0.5% and a specific density of at least 2.19 g/$cm^3$, and at a temperature of 1000° C. has a spectral emissivity of at least 0.7 for wavelengths between 2 and 8 μm.

The matrix of the composite material of the invention is either opaque but preferably translucent or transparent. The matrix is intercalated in very fine division with regions of a phase that comprises silicon (Si) in elemental form and is referred to here as "Si phase". The Si phase consists of an Si-based alloy, of doped silicon or of undoped silicon. At its most simple it is polycrystalline, though it can also be monocrystalline or amorphous.

The finely divided regions of the Si phase act within the matrix firstly as optical defect sites, and give the composite material—according to layer thickness—a black or blackish-grey visual appearance at room temperature. Secondly, the defect sites also have consequences for the absorption of heat by the composite material overall. This is essentially attributable to the properties of the semiconducting elemental silicon, whereby on the one hand the energy between valency band and conduction band (band-gap energy) decreases with the temperature, and on the other hand, given sufficiently high activation energy, electrons are promoted from the valency band into the conduction band, a process associated with a significant rise in the absorption coefficient. The thermally activated occupation of the conduction band means that semiconducting silicon is to a certain extent transparent for certain wavelengths (such as above about 1000 nm) at room temperature and is opaque at high temperatures. This effect is dependent on factors including structure (amorphous/crystalline) and doping of the silicon, is noticeable above about 600° C., and reaches saturation above about 1000° C.

According to Kirchhoff's radiation law, spectral absorptivity $\alpha_\lambda$ and spectral emissivity $\epsilon_\lambda$ of a real body in thermal equilibrium correspond to one another.

$$\alpha_\lambda = \epsilon_\lambda \quad (1)$$

Given knowledge of directional hemispherical spectral reflectance $R_{dh}$ and transmittance $T_{dh}$, the spectral emissivity $\epsilon_\lambda$ can be calculated as follows:

$$\epsilon_\lambda = 1 - R_{dh} - T_{dh} \quad (2)$$

In the case of the composite material of the invention, the emissivity is at least 0.7, and preferably, indeed, more than 0.75. On the assumption of a negligibly small transmission, therefore, the reflectance for wavelengths between 2 and 8 µm and at temperatures above 1000° C. is therefore not more than 0.3. The composite material of the invention is predestined as a thermal radiation absorber and diffuser for service in heat treatments at high temperatures above 600° C., more particularly above 800° C. and very preferably at 1000° C. or more.

This appears at the first glance to be surprising. Indeed, on account of their low thermal conductivity, opaque components made of fused silica are often employed as heat insulators—as a heat shield, for example. The function of a heat shield is to shield parts located behind it from the heat source. A heat shield must therefore be suitable for absorbing as little thermal radiation as possible and/or for irradiating as much as possible of it back, this being manifested in a low emission capacity and a high reflection capacity.

In contrast, the composite material of the invention exhibits high absorption capacity and emission capacity for thermal radiation between 2 µm and 8 µm, in other words in the wavelength range of infra-red radiation. The high absorption capacity for thermal radiation reduces the reflection thereof at the surfaces of the composite material. In this way, instances of local, non-reproducible heating as a result of reflected thermal radiation are avoided, and a uniform temperature distribution is obtained in the environment of the composite material.

The "spectral emissivity" referred to here is the "normal spectral emissivity". This quantity is determined on the basis of a measurement principle which is known under the designation "Black-Body Boundary Conditions" (BBC) and is published in "DETERMINING THE TRANSMITTANCE AND EMITTANCE OF TRANSPARENT AND SEMITRANSPARENT MATERIALS AT ELEVATED TEMPERATURES"; J. Manara, M. Keller, D. Kraus, M. Arduini-Schuster; 5th European Thermal-Sciences Conference, The Netherlands (2008).

The Si phase is very finely and homogeneously distributed within the fused silica matrix. Although it bears directly against the surface, there is no need for a coating to protect from oxidation. A coating would otherwise lead to additional unwanted reflections at the interface with the composite material.

In comparison to traditional opaque fused silicas, furthermore, the composite material of the invention exhibits surprising structural properties. It is impervious to gas—that is, it has no open porosity—and the volume fraction of closed pores within the composite material—at less than 0.5%—is relatively low. This is also a reason for the surprisingly high density of at least 2.19 g/cm$^3$. The specific densities of transparent, undoped fused silica and of elemental silicon are similar and are situated at approximately 2.2 g/cm$^3$ or at 2.33 g/cm$^3$ (silicon).

Large pores within the composite material may contribute to unwanted diffuse reflection. The low porosity of the composite material already limits this effect. Furthermore, the matrix preferably comprises small pores having a maximum pore dimension of less than 10 µm. The pores are formed predominantly between sintered $SiO_2$ particles, and generally have a non-circular form.

Owing to the low porosity and small pore sizes, the fused silica of the matrix, over a large wavelength range, appears not very opaque, but instead more translucent or even transparent. As a result, thermal radiation is able to penetrate deeply into the material, and in this way reaches lower-lying absorption centres in the form of regions composed of Si phase. This therefore contributes to greater heat absorption.

The spatial resolution of standard spectrometers does not allow the transmission of the matrix to be determined free of influence by the interspersed Si phase. The transparency or translucency of the matrix is evident, however, from the absence of visible bubbles under the microscope. With bubble-free fused silica, the direct spectral transmission at a path length of 1 mm in the wavelength range from 600 nm to 2650 nm is at least 0.3.

Since the composite material of the invention does not have any open porosity, a simple density measurement is possible in accordance with the principle of Archimedes. The porosity is determined from the density measurement, taking account of the specific composition of the composite material and of the specific densities of fused silica matrix and Si phase.

The absorption of heat by the composite material is dependent on the proportion of the Si phase. The greater the proportion of this phase, the higher the absorption capacity and emission capacity. The weight fraction of the Si phase ought therefore preferably to be at least 0.1%. On the other hand, a high volume fraction of the Si phase may hinder the production of the composite material. In light of this, the weight fraction of the Si phase is preferably not more than 5%.

The matrix of the composite material of the invention consists preferably of fused silica having a hydroxyl group content of not more than 30 ppm by weight.

The effect of hydroxyl groups is to lower the viscosity of fused silica. Hydroxyl groups are therefore unfavourable in respect of a high dimensional stability under thermal load.

The hydroxyl group content of transparent fused silica is customarily determined from an infra-red transmission measurement. For the heat-absorbing composite material, however, this method of measurement is not readily suitable. For this reason, the hydroxyl group content of the composite material is determined on the basis of emission measurements in the range of the absorption wavelength of the hydroxyl groups in fused silica (at 2.72 µm), by comparison with a standard of known hydroxyl group content.

The matrix consists of undoped or doped fused silica. Doped fused silica in the sense of the invention may comprise, apart from $SiO_2$, other oxidic, nitridic or carbidic components, in an amount up to a maximum of 20% by weight. The Si phase, besides silicon, may also comprise other semimetals or metals, but not more than up to 50% by weight, more preferably not more than 20% by weight. In the case of the preferred embodiment, in order to avoid a risk of contamination originating from the composite material, provision is made for the Si phase to consist of silicon having a metallic purity of at least 99.99%, and for the matrix to have a chemical purity of at least 99.99% $SiO_2$ and a cristobalite content of not more than 1%.

In the course of the production of the composite material, the silicon in the Si phase may take up oxygen, nitrogen or carbon. By metallic purity is meant the chemical purity solely of the metallic and/or semimetallic constituents of the phase, disregarding any non-metallic constituents, such as oxides, nitrides, carbides, oxynitrides and the like.

A low cristobalite content in the matrix, of 1% or less, ensures a low devitrification tendency and hence a low risk of cracking in service.

A particularly high emissivity can be achieved if the Si phase exhibits non-spherical morphology with maximum dimensions of on average less than 20 µm, but preferably more than 3 µm.

The non-spherical morphology of the Si phase also contributes to a high mechanical strength and to a low tendency on the part of the composite material towards cracking. The "maximum dimension" relates to the longest extent of an isolated region with Si phase that can be seen in a ground section. The median value of all of the longest extents in a ground-section image forms the average value specified above.

With regard to the heat-absorbing component comprising the composite material, the object stated above is achieved in accordance with the invention by a component which has at least one surface formed of the composite material that consists of a matrix of fused silica, in which regions of silicon-containing phase—"Si phase"—have been embedded, that is impervious to gas, and that has a closed porosity of less than 0.5% and a specific density of at least 2.19 g/cm$^3$, and, at a temperature of 1000° C., has a spectral emissivity of at least 0.7 for wavelengths between 2 and 8 µm.

The component of the invention consists wholly or partly of the composite material according to the invention. Where the component consists only partly of the composite material, said material forms at least part of the surface. On account of its chemical composition, a coating comprising the composite material is particularly suitable for application to fused silica, in other words for production of fused silica/composite material assemblies. The component, or at least the surface of the component, has the optical and structural properties elucidated above for the composite material of the invention, particularly with regard to the high emissivity of at least 0.7—preferably at least 0.75—and the low reflectance of not more than 0.3 at wavelengths between 2 and 10 µm and at a temperature of 1000° C.

At least in regions, therefore, the component possesses a fused silica matrix with a low pore content and with metallic and/or semimetallic Si phase incorporated therein in finely divided but encapsulated form. Even in the case of thin layers—above about 1 mm—the component is opaque in the visible wavelength range, but otherwise largely has the chemical and mechanical properties typical of fused silica.

Besides its use for applications involving high heat absorption and uniform temperature distribution requirements, therefore, the component is especially suitable also for applications where high thermal and chemical stability and high resistance with respect to corrosive gases and liquids are important factors. Such requirements often exist for components in semiconductor fabrication, in optics, and in chemical engineering. Furthermore, the component is visually appealing, and so uses from an artistic or aesthetic aspect also come into consideration.

However, the high emissivity of the composite material predestines the component more particularly for use in the context of heat treatments, where a reproducible and homogeneous temperature distribution is an important factor.

A large number of such components for use in the production of integrated circuits are disclosed in the book "Technology of integrated circuits" by D. Widmann, H. Mader, H. Friedrich, Springer Verlag (2000), ISBN-10: 3-540-66199-9, and especially in its chapter 3, "Film Technology".

A key constituent of the semiconductor elements is often silicon. During the heat treatment of such semiconductor elements, when using the component of the invention, a particular feature which arises is that the emission characteristics of the component largely follow, or correspond to, those of the semiconductor element. The reason for this is that the emission behaviour of the composite material is determined essentially by the incorporated Si phase.

The component of the invention is designed for example as a reactor, fitting or wafer holder for use in an oxidizing or heat-treating operation, in epitaxy or in chemical vapour deposition.

The component takes the form, for example, of a vessel, dish, enclosure, as a solid body, hollow body in expanded or curved form. In simple cases it is configured as a plate, ring, flange, dome, crucible or solid or hollow cylinder. The composite material may be present in the form of a solid body or a layer. In the latter case, for example, in the form of a fused silica/composite material assembly as a hollow cylinder having a hollow cylinder wall composed of a plurality of coaxial layers, of which one consists of the composite material.

With regard to the method of the invention for producing the composite material, the object specified above, starting from a method of the generic type specified at the outset, is achieved in accordance with the invention in that the forming of the shaped body comprises a slipcasting process in which a suspension is produced that comprises the powder mixture and/or the mixed powder in a liquid, the suspension is consolidated by removal of liquid to form a green body, and the shaped body is formed from the green body by drying.

In the method of the generic type, the shaped body is formed by hot pressing of a powder mixture. In contrast to this, the method of the invention comprises a slipcasting process in which, ahead of the shaped body, an intermediate is produced in the form of a green body. Both the slipcasting process itself and the intermediate state in the green body allow measures for the setting and alteration of properties having consequences from the ultimate composite material.

For instance, the processing of the initial powders in the suspension facilitates intimate mixing with one another and the establishment of a homogeneous distribution in the green body. The liquid also has the function of a binding agent or activating agent between the solid components. In the course of a long-lasting homogenizing operation, the liquid may alter the surfaces of the powder particles and give rise in particular to interactions between them, something which on subsequent sintering may contribute to a more impervious and more stable bond.

The suspension may be based on an organic solvent, preferably on an alcoholic basis or more preferably on an aqueous basis. The polar nature of the aqueous phase may be beneficial to the aforementioned interactions of the fused silica particles with one another and with the Si powder particles, thereby facilitating the drying and sintering of the green body.

In the green body state, the assembly of fused silica phase and Si phase is porous and can be modified via the gas phase, with particular mention being made of doping and reactive drying.

The green body in general already has a shape which comes close to the final contour of the component that is to be produced. The shape in question is, for example, a solid body, a hollow body, or a layer on a base body. The green body can be obtained by casting the suspension into a mould. However, other processing methods for the suspension are also suitable, such as introduction into a mould under suction, or else dipping, spraying, brushing on, trowelling on, transfer, deposition, knifecoating and the like.

The green body is dried and a largely water-free shaped body is obtained from it. As an inevitable result of its production, however, the green body contains a large amount of hydroxyl groups. It is sintered to form a gas-impervious, mechanically stable component comprising the composite material. The sintering temperature here is to be selected such that while the Si phase does not melt, the density achieved for the sintered composite material is as high as possible. The parameters suitable for the sintering (sintering temperature, sintering time, atmosphere) can be determined on the basis of simple experiments.

Despite thermal drying of the green body, the shaped body still contains hydroxyl groups, as an inevitable result of the production process. It has nevertheless emerged that the hydroxyl group content is significantly reduced, unexpectedly, in the course of sintering, to below the hydroxyl group contents present typically after on sintering of shaped bodies without an Si phase, with manufacturing parameters that are otherwise the same. This reduction in hydroxyl group content is therefore attributable to the presence of the Si phase in the shaped body.

At high temperature, the Si phase is able to react superficially with existing hydroxyl groups and/or with water, in accordance, for instance, with the following reaction equations:

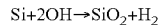

$Si + 2OH \rightarrow SiO_2 + H_2$

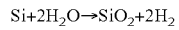

$Si + 2H_2O \rightarrow SiO_2 + 2H_2$

This reaction during sintering of the shaped body may be taken as a basis for the following properties of the composite material of the invention:

On sintering, water and hydroxyl groups that are present are used up and converted into $SiO_2$. Given the production technique via a slipcasting process, the hydroxyl group content of the sintered component is surprisingly low, and is preferably less than 30 ppm by weight. A result of this is a relatively high viscosity on the part of the composite material.

The pore volume is reduced. Any water-containing pores are able to close. As a result of the conversion of Si into $SiO_2$, there is an increase in volume of solid phase, since the unit cell of $SiO_2$ has approximately twice the volume of the Si unit cell. The increase in solid volume comes at the expense of the pore volume. As a result, the fused silica matrix contains only a few, preferably small pores, with a maximum pore dimension of less than 10 μm, and a closed porosity of less than 0.5%. This produces a certain optical transparency in the fused silica matrix, which is evident from the fact that its direct spectral transmission in the wavelength range between 600 nm and 2650 nm is preferably at least 0.3. The composite material overall acquires a surprisingly high density of 2.19 g/cm³ or more.

The incorporated Si phase reacts superficially to form $SiO_2$, this being a reaction product which is chemically identical with the matrix material. The Si phase which remains surrounded by an impervious shell of $SiO_2$ and encapsulated by the remaining, porous matrix material. This improves the fixing of the Si phase regions in the fused silica matrix, and contributes to high strength and imperviousness on the part of the composite material. The Si phase, moreover, is suitable for heat absorption, and so at high temperature the composite material exhibits a high spectral emissivity, which at 1000° C. attains a value of at least 0.7 for wavelengths between 2 and 8 μm.

The material obtained in this way therefore possesses a fused silica matrix of low pore content, with metallic and/or semimetallic Si phase incorporated therein in finely divided but encapsulated form. The component comprising the material takes the form of a solid body or a hollow body, consisting partly or completely of the composite material.

The suspension preferably comprises a powder mixture of fused silica powder and Si powder, the Si powder consisting of silicon having a metallic purity of at least 99.99%, having a particle size distribution characterized by a $D_{97}$ of between 1 and 20 μm and preferably >3 μm and a $D_{10}$ of 2 μm, and a volume fraction in the powder mixture of not more than 5%.

The "$D_{97}$" of the particle size distribution in this case means that a screened fraction contains at least 97% of the Si particles with sizes between 1 and 20 μm and preferably >3 μm. The $D_{10}$ of 2 μm means that not more than 10% of the particles can be assigned to a fine fraction with particle sizes of less than 2 μm. It has emerged that particularly finely divided Si powder can lead to a brown coloration, which for some applications is undesirable. The finely divided fraction, therefore, is limited advantageously to less than 10% of the powder particles, and the $D_{97}$ is preferably 3 μm or above (as between 3 μm and 20 μm). This limitation applies equally to any finely divided Si phase in Si—$SiO_2$ mixed powder.

Particle sizes between 1 to 20 μm prove to be particularly favourable, on the one hand, in view of the heat absorber function, and on the other hand, in the green body and in the composite material, the stresses they produce are so small that they have at most negligible consequences for the optical properties and the strength. In the context it has been found to be particularly appropriate for the volume fraction of the silicon powder in the powder mixture to be not more than 5%.

The Si powder may be mixed with the fused silica powder, by dry mixing, for example, even before the suspension is prepared. It has proved to be particularly favourable, however, if the Si powder is mixed into the liquid comprising the amorphous fused silica powder.

In that case the suspension of the fused silica powder particles is at least partly homogenized when the Si powder is added. The Si powder is mixed in before the liquid is removed. In the suspension, homogeneous mixing is particularly simple to accomplish, and after the Si powder has been mixed in, the suspension is stabilized by being kept continually in motion over a period of 8 to 96 h.

Where purity requirements are stringent, the $SiO_2$ content of the fused silica powder particles is at least 99.99% by weight.

The solids content, the particle size and the particle size distribution of the fused silica particles have consequences for the contraction of the green body on drying. Thus the contraction on drying can be reduced by using relatively coarse $SiO_2$ particles. In this context, established fused silica powders are those in which the amorphous fused silica particles have particle sizes in the range up to a maximum of 200 µm, more preferably a maximum of 100 µm, with fused silica particles having particle sizes in the range between 1 µm and 60 µm making up the largest volume fraction of the fused silica powder.

In conjunction with a high solids content on the part of the suspension, fused silica particles in this size range exhibit advantageous sintering characteristics and comparatively low contraction on drying, and accordingly facilitate crack-free drying of the green body. This can be attributed to interactions of the $SiO_2$ particles with one another.

In this connection, fused silica particles having a particle size distribution which is characterized by a $D_{50}$ of less than 50 µm, preferably less than 40 µm, prove to be particularly advantageous.

Also making a contribution to this is a procedure in which the fused silica particles are produced by wet grinding of initial granular $SiO_2$.

In this connection, the desired particle size distribution is set in the process of homogenizing the suspension, as a function of the grinding time and of the addition of amorphous initial granules. In the course of the wet grinding, amorphous fused silica particles of every size are formed within the suspension, including particles which develop the above-described interactions and bonds within the suspension itself as a result of interactions with one another.

The $SiO_2$ content of the amorphous fused silica particles is preferably at least 99.99% by weight. The solids fraction of a suspension prepared using such particles consists of $SiO_2$ to an extent of at least 99.99% by weight. Binders or adjuvants of that kind are not provided. The level of impurities is preferably less than 1 ppm by weight. This starting material does not pose any risk of contamination or crystallization. The cristobalite fraction in the dried green body ought to be not more than 0.1% by weight, since otherwise the sintering may be accompanied by crystallization and hence by the rejection of the component.

In order to avoid melting of the Si phase during sintering of the shaped body, the shaped body is heated to a sintering temperature below the melting temperature of the semimetal. The shaped body here is held at the sintering temperature for a period of at least 30 minutes.

WORKING EXAMPLE

The invention is elucidated in more detail below by means of working examples and a drawing. As single figure, FIG. 1 shows a flow diagram to illustrate the production of one embodiment of the fused silica component of the invention for use in semiconductor fabrication, on the basis of one procedure according to the invention;

Figure 1:
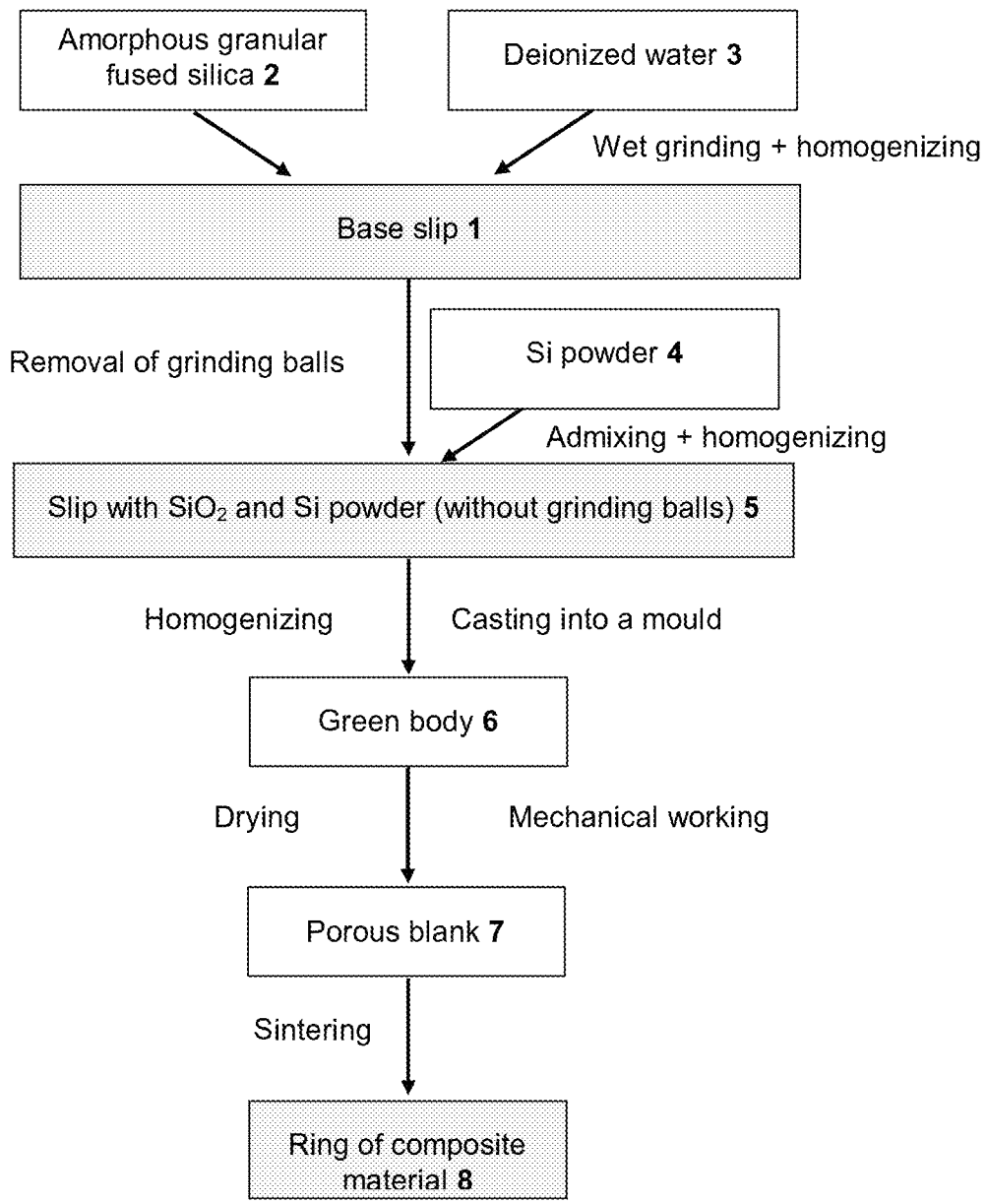

The method of the invention is elucidated by way of example hereinafter, using the production of a heat insulation ring made of fused silica for an RTP reactor for the treatment of a wafer, with reference to FIG. 1.

Sample 1

For a batch of 10 kg of base slip 1 ($SiO_2$/water slip), in a drum mill having a fused silica lining and a capacity of approximately 20 liters, 8.2 kg of amorphous granular fused silica 2, obtained by fusing natural raw silica material and having particle sizes in the range between 250 µm and 650 µm, are mixed with 1.8 kg of deionized water 3 having a conductivity of less than 3 µS. The granular fused silica 2 has been purified beforehand in a hot chlorinating process; it is ensured that the cristobalite content is below 1% by weight.

This mixture is ground on a roller bed at 23 rpm, using fused silica grinding balls, for a period of 3 days until the base slip 1 is homogeneous and has a solids content of 78%. In the course of the grinding procedure, as a result of $SiO_2$ passing into solution, there is a lowering in the pH to approximately 4.

The grinding balls are subsequently removed from the resultant base slip 1, and an admixture is made, in the form of silicon powder 4 having a metallic purity of 99.99%, in an amount such as to give a solids content of 83% by weight.

The silicon powder 4 consists of substantially non-spherical powder particles with a narrow particle size distribution, whose $D_{97}$ is approximately 10 µm and whose fine fraction, with particle sizes of less than 2 µm, has been removed beforehand. The silicon powder 4 is dispersed uniformly in the base slip 1 by continuous mixing.

The slip filled with the silicon powder 4 is homogenized for a further 12 hours. The homogeneous slip 5 obtained in this way has a solids content of 83%. The weight fraction of the silicon powder as a proportion of the overall solids content is 5%, and the volume fraction, owing to the similar specific densities of $SiO_2$ and Si, is likewise almost 5%—more precisely, 4.88%. The $SiO_2$ particles 2 in the fully homogenized slip 5 exhibit a particle size distribution characterized by a $D_{50}$ of about 8 µm and by a $D_{90}$ of about 40 µm.

The slip 5 is cast into a pressure casting mould in a commercial pressure casting machine and dewatered via a porous polymeric membrane, to form a porous green body 6. The green body 6 has the shape of a ring for an RTP reactor for the treatment of wafers.

For the purpose of removing bound water, the green body 6 is dried in a ventilated oven at about 90° C. for five days and, after cooling, the resulting porous blank 7 is worked mechanically almost to the final dimensions of the fused silica ring 8 to be produced.

For the sintering of the blank 7, it is heated in a sintering oven, under air, to a heating temperature of 1390° C. over the course of an hour, and is held at this temperature for 5 h. Cooling takes place with a cooling ramp of 1° C./min to an oven temperature of 1000° C., and thereafter without regulation, with the oven closed.

The resulting fused silica ring 8 is superficially abraded to give an average surface roughness Ra of approximately 1 μm. It consists of a gas-impervious composite material having a density of 2.1958 g/cm$^3$, in which non-spherical regions of semimetallic Si phase, separated from one another in a matrix of opaque fused silica, are distributed homogeneously, the size and morphology of these Si phase regions corresponding largely to those of the Si powder employed. The maximum dimensions are on average (median value) in the range from about 1 to 10 μm. The composite material is stable in air to a temperature of up to about 1200° C.

In visual terms, the matrix is translucent to transparent. When viewed under a microscope, it exhibits no open pores, and at most closed pores with maximum dimensions of on average less than 10 μm; the porosity as calculated on the basis of the density is 0.37%, assuming a theoretical matrix density of 2.2 g/cm$^3$ and a theoretical Si phase density of 2.33 g/cm$^3$.

The incorporated Si phase contributes to the opacity and also has consequences for the thermal properties of the composite material overall. This composite material exhibits high absorption of thermal radiation at high temperature. This is shown by the diagram of FIG. 2, with the spectral profile of the emissivity of this material.

The emissivity at room temperature is measured in a customary way, using an Ulbricht sphere. This allows measurement of the directional hemispherical spectral reflectance $R_{dh}$ and of the directional hemispherical spectral transmittance $T_{dh}$, from which the normal spectral emissivity is calculated.

The measurement at elevated temperature in the wavelength range from 2 to 18 μm takes place by means of an FTIR spectrometer (Bruker IFS 66v Fourier Transform Infra-red (FTIR)), to which a BBC sample chamber is coupled via an additional optical system, on the basis of the aforementioned BBC measurement principle. This sample chamber, in the half-spaces in front of and behind the sample mount, has temperature-conditionable black-body surrounds and a beam exit opening with detector. The sample is heated to a predetermined temperature in a separate oven, and for measurement is moved into the beam path of the sample chamber, with the black-body surrounds set to the predetermined temperature. The intensity captured by the detector is composed of an emission component, a reflection component and a transmission component that is, of intensity emitted by the sample itself, intensity impinging on the sample from the front half-space and reflected by said sample, and intensity which impinges on the sample from the rear half-space and is transmitted by said sample. Three measurements must be carried out in order to determine the individual parameters of emissivity, reflectance and transmittance.

Figure 2:
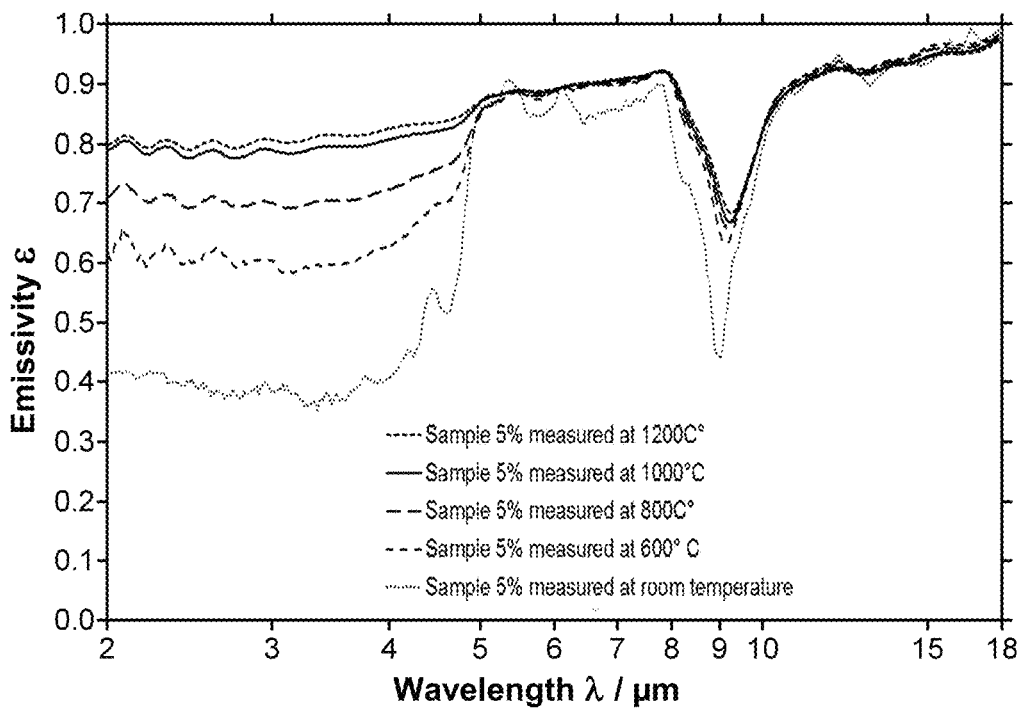
FIG. 2 shows a diagram with the normal emissivity as a function of the wavelength at different temperatures for a sample with 5% by weight Si phase.
Figure 3:
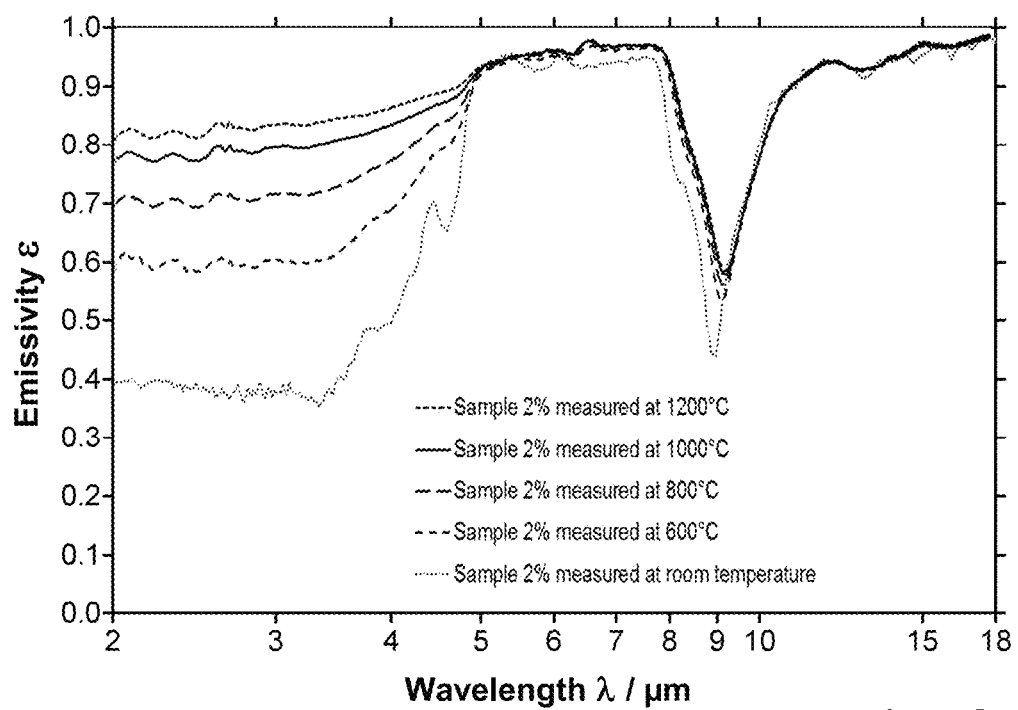
FIG. 3 shows a diagram of the normal emissivity as a function of the wavelength at different temperatures for a sample with 2% by weight Si phase.
Figure 4:
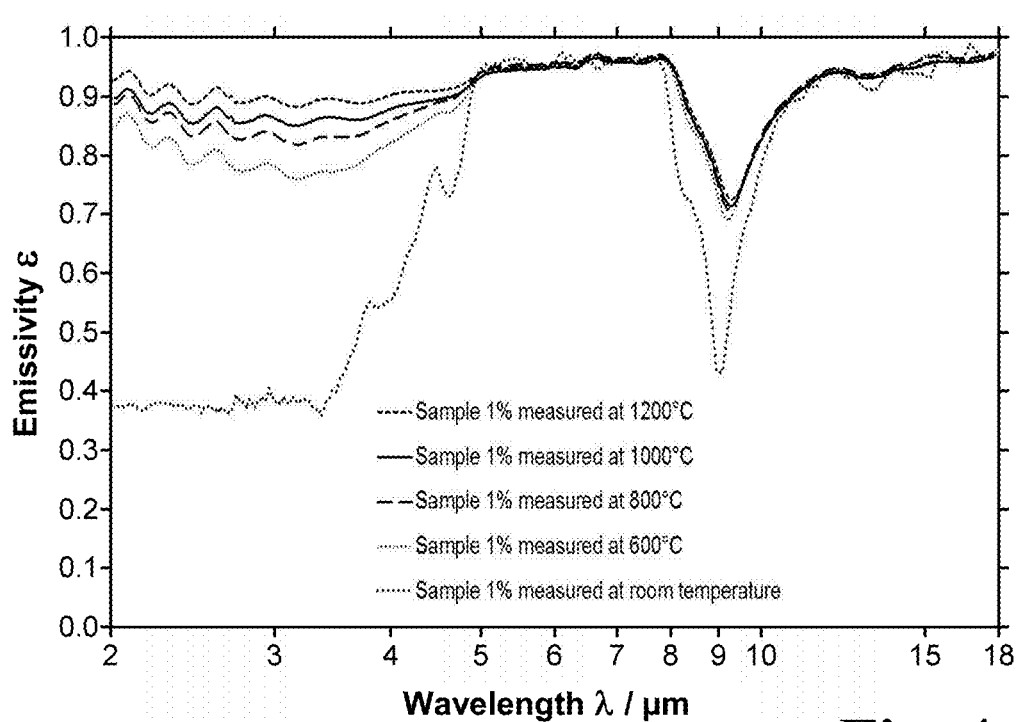
FIG. 4 shows a diagram of the normal emissivity as a function of the wavelength at different temperatures for a sample with 1% by weight Si phase.

The diagram of FIG. 2, and also the further diagrams of FIGS. 3 and 4, each show the profile of the normal emissivity ε as a function of the measurement wavelength λ (in μm and in logarithmic plotting), over the wavelength range from 2 to 18 μm and for different temperatures of the sample body between room temperature and 1200° C.

FIG. 2 shows that the emissivity of sample 1 with 5% by weight Si phase in the wavelength range from 2 to about 4 μm is heavily dependent on the temperature of the sample body. The greater the heating of the sample body, the higher the emission in this wavelength range, with no substantial difference being evident any longer between 1000° C. and 1200° C. In the case of the samples heated to 1000° C. and 1200° C., the normal emissivity in the whole of the wavelength range between 2 and 8 μm is above 0.75; at the wavelength of 3 μm it is 0.79.

In principle, the emissivity increases essentially with the wavelength, but exhibits a pronounced minimum at approximately for measurement radiation of around 9 μm. The minimum can be attributed to reflection by the fused silica of the matrix.

The effect of the incorporation of Si phase, and the production technique via the slipcasting route, are apparent, in particular, from the following phenomena:

As the temperature of the sample body goes up, there is an increase in the emission in the wavelength range between 2 and 5 μm. At the maximum measurement temperature of 1200° C., the maximum emission in this wavelength range is achieved as well. At the sample body temperature of 1000° C., the emission in the entire wavelength range between 2 and 8 μm is more than 70%. In this wavelength range, therefore, the material exhibits low reflection and low transmission.

Figure 5:
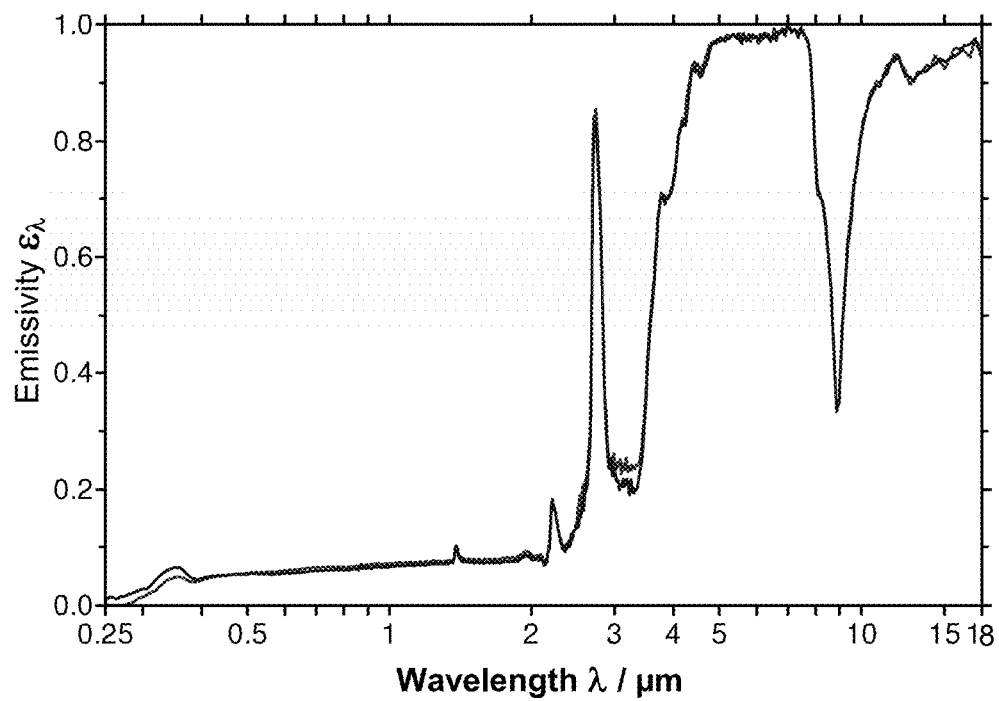
FIG. 5 shows a diagram of the normal emissivity as a function of the wavelength of two different samples from the prior art, at room temperature, for comparison.

In the wavelength range around 2.72 μm, which is characteristic for the absorption and emission of hydroxyl groups in fused silica, there is no noticeable effect. This is made clear in particular by comparison of the spectral emission profile of the measurement sample at room temperature (as shown for sample 1 in FIG. 2) with the profile of the spectral emission for the comparative sample in accordance with FIG. 5. The production of the comparative sample C1—as elucidated in more detail later on below—differs primarily, apart from small differences in the sintering conditions (see Table 1), in that the base slip contains no added Si. The diagram of FIG. 5 shows that the material of the comparative sample, in the wavelength range between 0.25 μm and about 3.5 μm, has a pronounced emission band at 2.72 μm, which is attributable to the hydroxyl group content of this material. This emission band is completely absent for the composite material of sample 1 (and also, moreover, in the case of samples 2 and 3, as shown by FIGS. 3 and 4). From the respective emission measurements at room temperature, taking account of error tolerances, the hydroxyl group content for samples 1 to 3, averaged over the sample thickness, is not more than 20 ppm by weight. The fact that a low hydroxyl group content is obtained in spite of non-reactive drying of the green body (without use of drying reagents, such as fluorine or chlorine), shows that the Si phase consumes hydroxyl groups during the sintering of the composite material to high density.

Using the slipcasting process elucidated above, further composite materials were produced, with the composition and individual process parameters varied experimentally. Table 1 reports these parameters and the results measured on the samples.

FIG. 3 shows the spectral profile of the emissivity of sample 2 (with 2% by weight Si phase), and FIG. 4 shows the profile for sample 3 (with 1% by weight Si phase). The comparison of the respective maximum values of the emissivity in the wavelength range from 2 to 4 μm shows the surprising outcome that the measurement sample with the smallest Si phase content (sample 3, with 1% by weight) shows the highest emissivity of all of the samples measured, with 0.85 at 3000 nm and 1000° C. This can be attributed to the fact that with a small Si phase content, lower-lying layers of material make a greater contribution to the emission than for a higher level. With an Si phase content of less than 1% by weight, therefore, even higher emissivities are likely in principle.

In the course of its intended use in an RTP reactor, the ring of composite material produced in this way surrounds a wafer that is to be treated. The internal diameter of this ring corresponds to the outer diameter of the wafer. The heating element of the RTP apparatus is generally configured as an array of IR emitters which are located in a plane above and/or below the combination of wafer and ring. The ring of composite material diminishes the effect of excessively rapid cooling at the wafer edge, and so contributes to uniform temperature distribution over the entire wafer surface.

In principle the composite material is predestined for applications where high heat absorption and low heat reflection, or a particularly homogeneous temperature distribution, are important factors. It may take a wide diversity of geometric forms, such as the form of a reactor, apparatus, carrier tray, bell, crucible or protective shield, or else the form of more simple components such as tubes, rods, plates, flanges, rings or blocks. Other examples include the following:

described in DE 44 40 104 A1. Apart from the use of Si-containing starting material to produce the base slip, and slight differences with regard to the sintering conditions, the production of this material corresponds to that of Example 1. It has a density of about 2.16 g/cm³ and a closed porosity of 2.5% and it acts primarily as a diffuse reflector, this being evident from the fact that it possesses a virtually constant direct spectral transmission of less than 10% in the wavelength range from 190 to 2650 nm with a path length of just 1 mm.

The diagram of FIG. 5 shows the spectral emissivity of this material (from two measurement runs) in the wavelength range between 0.25 μm and 18 μm at room temperature. In the visible wavelength range to approximately 2 μm, the emissivity is less than 10%, a fact which can be attributed primarily to the high reflectivity of the opaque fused silica. At a wavelength of around 2.7 μm, the absorption or emission band already mentioned earlier on above is apparent, this band being assignable to hydroxyl groups in the fused silica, amounting to around 300 ppm by weight in the case of this fused silica.

TABLE 1

| Sample | C1 | 1 | 2 | 3 | 4 | 5 |
|---|---|---|---|---|---|---|
| Production process/liquid | Slip/H₂O | Slip/H₂O | Slip/H₂O | Slip/H₂O | Slip/H₂O | Slip/H₂O |
| Sintering temperature/time (° C./h) | 1435/3 | 1390/5 | 1390/5 | 1390/5 | 1350/24 | 1350/48 |
| Si phase content (% by weight) | 0 | 5 | 2 | 1 | 2.5 | 2.5 |
| Si phase particle size: D97 | — | 10 | 10 | 10 | 10 | 12 |
| Hydroxyl group content (ppm by weight) | 300 | <20 | <20 | <20 | <20 | <20 |
| Density (g/cm^3) | 2.16 | 2.1930 | 2.1945 | 2.1958 | 2.1966 | 2.1998 |
| Porosity (%) | 2.5 | 0.37 | 0.4 | 0.5 | 0.30 | 0.15 |
| Emissivity @ 1000° C./3000 nm | 0.21 | 0.79 | 0.79 | 0.85 | 0.75 | 0.81 |

The use as a heat store element for the thermal conditioning of semiconductor components or displays, including in particular in short-duration oxidizing and heat-treating processes.

The use as a reactor or dome in the context of high-speed epitaxy, for both homo and hetero processes.

The use as heat protection and cladding element especially with respect to IR radiation between 2 and 8 μm at high temperatures.

The use for artistic or design applications.

Comparative Example 1 (Sample C1)

The high density, low porosity and high emissivity of the composite material of the invention are attributable substantially to the nature, size and distribution of the Si phase inclusions.

This is shown by comparison with a commercial opaque fused silica ring without corresponding inclusions of Si phase. A material of this kind and its production are The figures for the emissivity are based on the composite material as a whole. For samples 4 and 5, these values were not determined (n.d.). In column "C1", the data for the above comparative example are reported.

The invention claimed is:

1. A composite material comprising:
   a matrix of fused silica in which regions of a phase containing silicon in elemental form have been embedded, wherein said silicon is present as a silicon alloy or as doped or undoped silicon, and wherein the phase containing said silicon in elemental form is present in a weight fraction that is at least 1% but not more than 5%,
   wherein the composite material is impervious to gas, has a closed porosity of less than 0.5% and a specific density of at least 2.19 g/cm³, and, at a temperature of 1000° C., has a spectral emissivity of at least 0.7 for wavelengths between 2 and 8 μm measured with a path length of 1 mm; and
   wherein the matrix consists essentially of fused silica having a hydroxyl group content of not more than 30 ppm by weight.

2. The composite material according to claim 1, wherein the matrix has pores therein with a maximum pore dimension of less than 10 μm.

3. The composite material according to claim 1,
wherein the phase of said silicon in elemental form consists essentially of silicon having a metallic purity of at least 99.99% and wherein the matrix possesses a chemical purity of at least 99.99% $SiO_2$ and a cristobalite content of not more than 1%.

4. The composite material according to claim 1,
wherein the phase of said silicon in elemental form has non-spherical morphology with maximum dimensions of on average less than 20 μm.

5. A heat-absorbing component, comprising:
at least one surface formed from a composite material comprising a matrix of fused silica in which regions of a phase containing silicon in elemental form have been embedded wherein said silicon is present as a silicon alloy or as doped or undoped silicon, and wherein the phase containing said silicon in elemental form is present in a weight fraction that is at least 1% but not more than 5%,
wherein the composite material is impervious to gas, has a closed porosity of less than 0.5% and a specific density of at least 2.19 g/cm³, and, at a temperature of 1000° C., has a spectral emissivity of at least 0.7 for wavelengths between 2 and 8 μm measured with a path length of 1 mm; and
wherein the matrix consists essentially of fused silica having a hydroxyl group content of not more than 30 ppm by weight.

6. The component according to claim 5, wherein the component is a reactor, fitting, or component configured to be used in an oxidizing or heat-treating operation, in epitaxy, or in chemical vapour deposition.

7. The component according to claim 5, wherein the component is a plate, ring, flange, dome, crucible, or solid or hollow cylinder.

8. The composite material according to claim 1,
wherein the phase of said silicon in elemental form has non-spherical morphology with maximum dimensions of on average between 3 and 20 μm.

9. The heat-absorbing component according to claim 5, wherein the matrix has pores therein with a maximum pore dimension of less than 10 μm.

10. The heat-absorbing component according to claim 5, wherein the phase of said silicon in elemental form consists essentially of silicon having a metallic purity of at least 99.99% and wherein the matrix possesses a chemical purity of at least 99.99% $SiO_2$ and a cristobalite content of not more than 1%.

11. The heat-absorbing component according to claim 5, wherein the phase of said silicon in elemental form has non-spherical morphology with maximum dimensions of on average less than 20 μm.

12. The heat-absorbing component according to claim 5, wherein the phase of said silicon in elemental form has non-spherical morphology with maximum dimensions of on average between 3 and 20 μm.

13. The heat-absorbing component according to claim 6, wherein the matrix has pores therein with a maximum pore dimension of less than 10 μm.

14. The heat-absorbing component according to claim 6, wherein the phase of said silicon in elemental form consists essentially of silicon having a metallic purity of at least 99.99% and wherein the matrix possesses a chemical purity of at least 99.99% $SiO_2$ and a cristobalite content of not more than 1%.

15. The heat-absorbing component according to claim 6, wherein the phase of said silicon in elemental form has non-spherical morphology with maximum dimensions of on average less than 20 μm.

16. The heat-absorbing component according to claim 6, wherein the phase of said silicon in elemental form has non-spherical morphology with maximum dimensions of on average between 3 and 20 μm.

17. The heat-absorbing component according to claim 7, wherein the matrix has pores therein with a maximum pore dimension of less than 10 μm.

18. The heat-absorbing component according to claim 7, wherein the phase of said silicon in elemental form consists essentially of silicon having a metallic purity of at least 99.99% and wherein the matrix possesses a chemical purity of at least 99.99% $SiO_2$ and a cristobalite content of not more than 1%.

19. The heat-absorbing component according to claim 7, wherein the phase of said silicon in elemental form has non-spherical morphology with maximum dimensions of on average less than 20 μm.

20. The heat-absorbing component according to claim 7, wherein the phase of said silicon in elemental form has non-spherical morphology with maximum dimensions of on average between 3 and 20 μm.

* * * * *